United States Patent [19]

Krahn

[11] 4,370,598
[45] Jan. 25, 1983

[54] BIFILAR HELICAL ELECTRODE ARRANGEMENT FOR TRANSVERSELY EXCITING GASEOUS LASER MEDIA

[76] Inventor: Karl-Heinz Krahn, Hustadtring 147, 4630 Bochum-Querenburg, Fed. Rep. of Germany

[21] Appl. No.: 190,367

[22] Filed: Sep. 24, 1980

[30] Foreign Application Priority Data

Sep. 27, 1979 [DE] Fed. Rep. of Germany ....... 2939121

[51] Int. Cl.³ .............................................. H01J 7/44
[52] U.S. Cl. ........................................ 315/59; 372/87
[58] Field of Search ........................ 372/87, 88, 83, 81

[56] References Cited

U.S. PATENT DOCUMENTS 3,427,567  2/1969  Bridges et al. ........................ 372/82
3,725,735  4/1973  Beaulieu et al. ...................... 372/87

Primary Examiner—William L. Sikes
Assistant Examiner—Leon Scott, Jr.
Attorney, Agent, or Firm—Thomas H. Murray

[57] ABSTRACT

A bifilar helical electrode arrangement for the transverse gaseous laser media and particularly adapted to produce laser radiation in those gaseous laser media, such as nitrogen, which are characterized by an extremely short lifetime of the upper laser level. As a consequence of the electrode geometry, the invention favors the generation of laser beams exhibiting a circular symmetric beam cross section which can easily be focused using customary spherical optics. The invention incorporates intertwined helical anode and helical cathode structures together with capacitors that are connected to the helical electrode structure via low-resistance and low-inductance leads or are directly interposed between successive convolutions of that helical electrode structures.

7 Claims, 4 Drawing Figures

BIFILAR HELICAL ELECTRODE ARRANGEMENT FOR TRANSVERSELY EXCITING GASEOUS LASER MEDIA

BACKGROUND OF THE INVENTION

The present invention relates to a bifilar helical electrode arrangement for the transverse excitation of gaseous laser media. The electrode arrangement comprises a helical anode and a helical cathode which are constucted as extended electrodes exhibiting an appropriate profile or which are occupied with a number of individual electrodes (i.e., the helix can be provided with pin electrodes).

By utilizing the bifilar helical electrode arrangement of the invention, atomic gases, molecular gases, gas mixtures, metal vapors, and even gaseous laser media which display an extremely short-lived upper laser level (e.g., nitrogen) can now be excited to intense laser action by a pulsed transverse gas discharge, the helical electrode structure favoring the creation of a laser beam of circular, symmetrical cross section.

A bifilar helical electrode arrangement for the transverse excitation of a molecular laser is described in U.S. Pat. No. 3,725,735 issued Apr. 3, 1973. In that electrode arrangement, the helical anode, as well as the helical cathode, are covered with numerous pin electrodes spaced therealong. In the aforesaid application, the cathode pins are electrically interconnected outside of the discharge envelope of the laser by means of a helical current bus whereas the anode pins are required to be decoupled by utilizing suitable ballast resistors which serve the additional purpose of limiting the current within each discharge channel and thereby stabilizing the nascent arc. Likewise, the external connecting leads of decoupling resistors are interconnected in a helical anode current bus. Cathode and anode current distributors are usually connected to the high voltage supply necessary for excitation at one point only, preferably the central point. It is important in such known bifilar helical electrode arrangements that the discharge gap of the laser be connected in series with a high voltage switch and the capacitor to be discharged. In addition, this part of electrical discharge circuit commonly exhibits a relatively large inductance caused by the intrinsic inductances of the switch and the capacitance, respectively, and by virtue of the necessarily large area conduction paths.

As a consequence of their construction, prior art bifilar helical electrode arrangements are suitable only for the excitation of easily invertable gases (e.g., carbon dioxide) because of the high inductive discharge circuits causing a relatively low rate of voltage and current rise within the gas discharge. Such easily invertable gases can be excited by a comparatively low rate of current rise because of the long lifetime of the excited laser level. On the other hand, the prior art arrangements are not suited for gaseous laser media in which the lifetime of the excited laser level does not exceed 100 nanoseconds. Laser media of this type have to be excited within an equally short time period in order to effectively generate a population inversion. The best known of such laser media is nitrogen for which the lifetime of the excited laser level is only 40 nanoseconds, a value which is generally recognized as a criterion for a "fast" discharge arrangement.

SUMMARY OF THE INVENTION

The present invention provides a bifilar helical electrode arrangement of the type described above capable of producing laser radiation in gaseous laser media characterized by an extremely short lifetime of the excited laser level. Furthermore, the invention provides more effective excitation of the higher laser levels in gaseous laser media which possess a relatively long lifetime of the excited laser levels (e.g., carbon dioxide).

In accordance with the invention, the foregoing desirable effects are achieved by connecting energy storage elements (i.e., capacitors) between the anode and cathode helical electrode structures of the bifilar arrangement. These capacitors are connected to the electrode structures via low resistance and low inductance leads and are preferably equidistantly spaced along the helical structures. By using such energy storage elements, it is possible to generate laser action even in those cases where the laser media possess an excited laser level with an extremely short lifetime. That is, by inserting capacitors into the bifilar helix and by making use of the above-described leads, the discharge current loops can be kept sufficiently small and sufficiently low-inductive in order to facilitate the high rate of current rise being necessary for an effective excitation of gaseous laser media exhibiting an extremely short lifetime of the upper laser level. Moreover, with gaseous laser media exhibiting a longer lifetime of the upper laser level, a population inversion can, as a consequence of the rapidity of the current rise, be generated more efficiently than is possible with the prior art bifilar helical electrode arrangements, since, based on the short duration of the discharge process, parasitic loss mechanisms affecting the upper laser level can extensively be avoided.

Advantageous developments of the invention are suggested in case the breakdown behavior of the gaseous laser medium under consideration should require additional dischargestabilizing means. These additional measures refer to the segmentation of the bifilar helix resulting in a number of discrete electrode sections, and the decoupling of single electrodes among one another. In the preferred embodiment of the invention, segmentation of the andoe helix produces several coordinate electrode sections which, in turn, are connected to separate capacitors across which a high voltage pulse occurs. This results in a coarse decoupling of each section from neighboring sections in that each section is correlated to its own energy storage element. Also, successive pin electrodes of each helix are decoupled from each other by means of suitable decoupling resistors. This facilitates a uniform distribution of the discharge current among the individual electrodes in order to prevent the gas discharge from being confined to only a few high current arcs. In summary, the coarse as well as the fine - decoupling means, applied either singly or in a combined manner, have got the task of producing a uniform and diffuse gas discharge on the full length of the electrode structure and, therefore, providing a stable transverse gas excitation.

By using a helical electrode structure of this type in a gaseous laser, an almost circular beam cross section can be generated. This is not done by selecting a homogeneous part of the discharge using a circular aperture, but simply is the consequence of a highly rotational symmetrical transverse excitation of the medium. As a result of the superpositioning of numerous transverse single discharges between the pin electrodes, whose discharge axes are rotated by a small angle with respect to the axes of the next neighboring pair, a homogeneously illuminated circle, slightly brighter at the center, appears. This indicates a natural preference of the transverse fundamental mode $TEM_{OO}$ when an optical resonator is used. A beam of this type with a circular cross section displays uniform divergence, meaning that only one parameter need be known instead of horizontal and vertical divergence as in the past. Moreover, a laser beam of this type with circular cross section possesses almost ideal focusing properties. In this respect, the invention is particularly adaptable for focusing nitrogen laser radiation to a point at extremely high power densities, using customary spherical quartz lenses.

The above and other objects and features of the invention will become apparent from the following detailed description taken in connection with the accompanying drawings which form a part of this specification, and in which.

Figure 1:
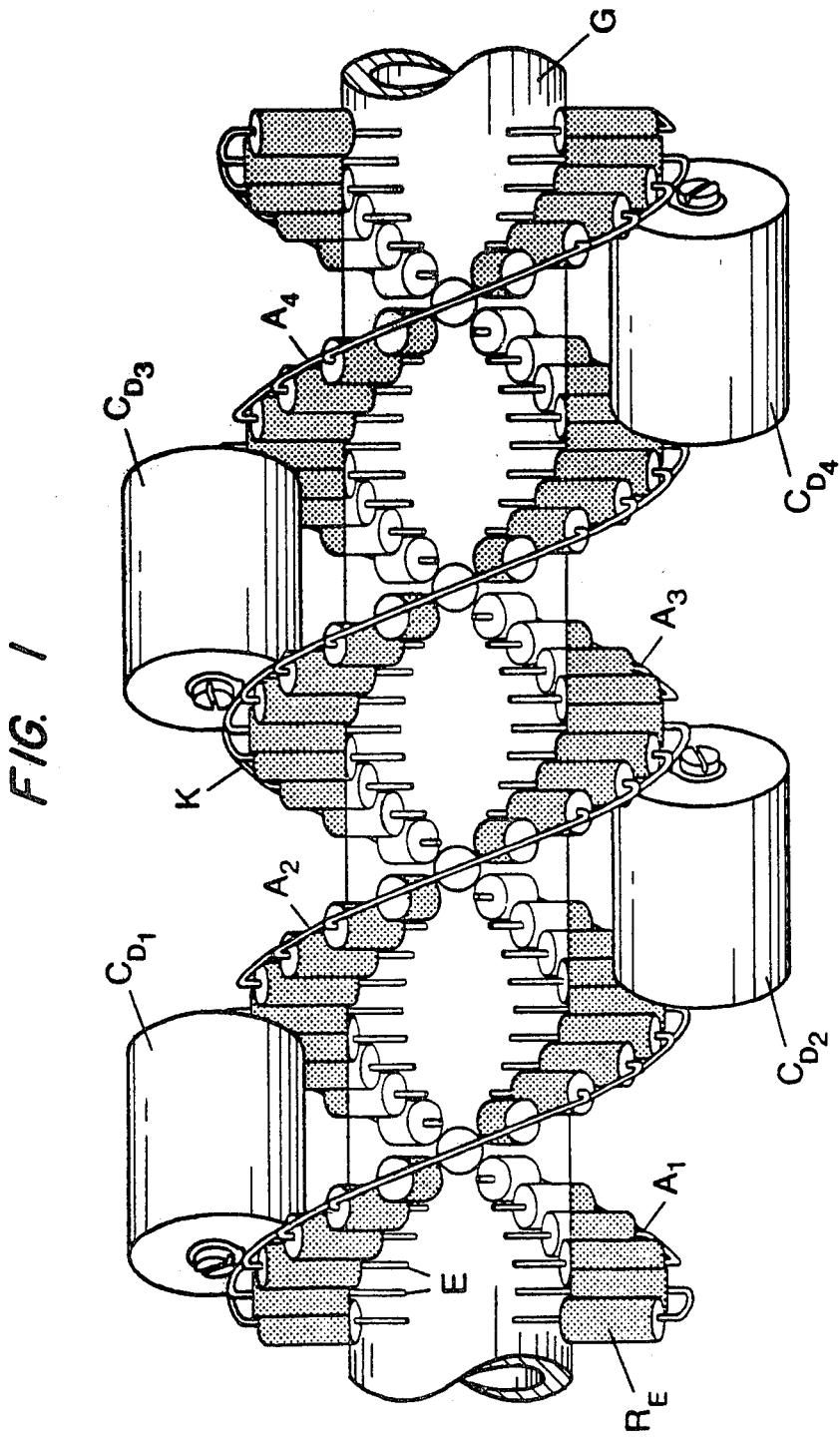
FIG. 1 illustrates the inventive bifilar helical electrode arrangement for a laser utilizing capacitors connected directly to the bifilar helix.
Figure 2:
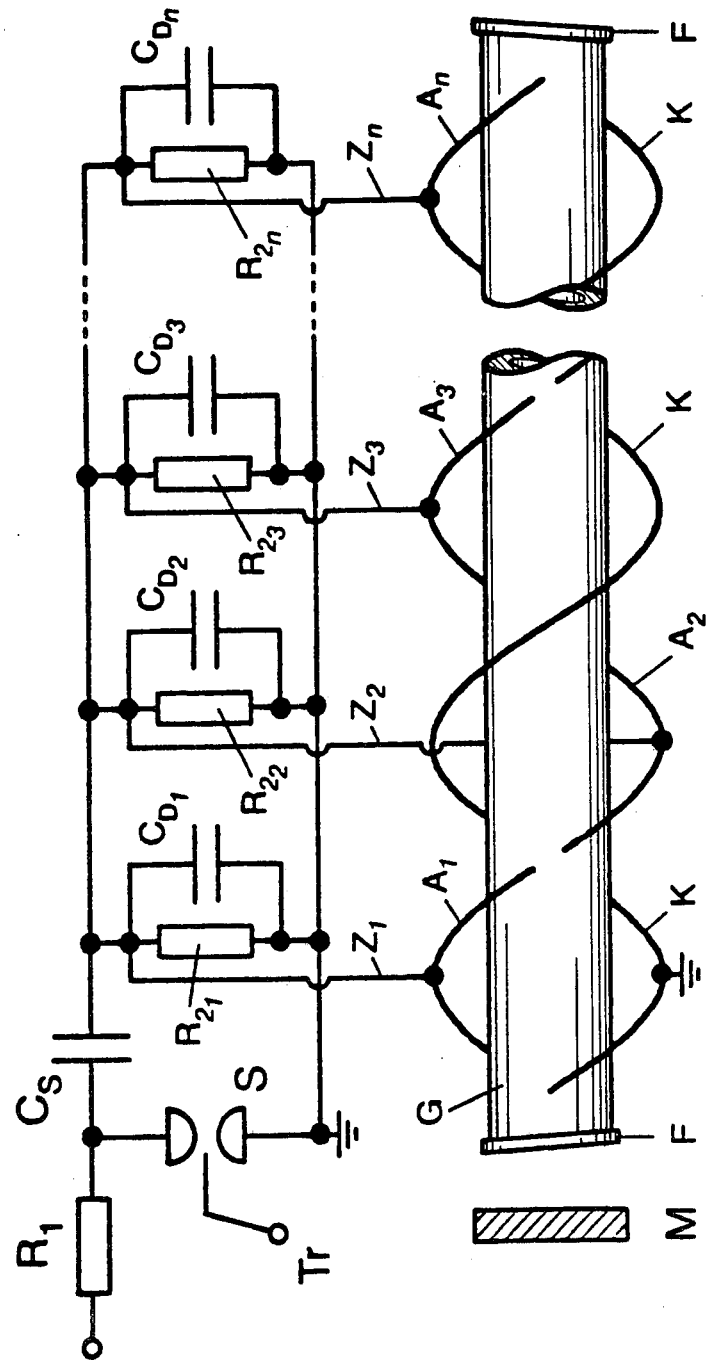
FIG. 2 is a schematic circuit illustration of the electrical discharge circuit of the invention.

With reference now to the drawings, and particularly to FIGS. 1 and 2, a laser tube is designated generally by G. It comprises an acrylic glass tube typically having an external diameter of 40 millimeters and a total length of 600 millimeters. Quartz windows F (FIG. 2) are sealed to both ends of the tubes by means of O-rings, as is conventional. The active length of the tube covered by the electrode structure of the invention is typically 500 millimeters.

The electrode system itself comprises a helical anode A and a helical cathode K. The cathode, it will be noted, rotates around the tube axis and is displaced with respect to the anode by 180°. Both electrodes include a series of hot-molded, fixed-composition carbon resistors $R_E$ which serve as decoupling elements and which possess resistance of typically 10 ohms at a power rating of 2 watts. The lower leads of the resistors $R_E$ which act as electrode pins E are of equal length, pass through holes in laser tube G and are glued to the acrylic glass tube in sealing engagement. With this arrangement, it will be noted that there is an anode electrode pin diametrically opposite each cathode electrode pin, between which a discharge gap exists. The discharge gap between electrodes and the helix pitch are 20 millimeters and 100 millimeters, respectively. The helix pitch effects exactly 5 turns of the bifilar helix along the active length of the laser. In the embodiment of the invention shown, there are a total of 101 pin electrode pairs distributed over the length of the laser tube; while 20 pairs are included in each turn of the helix. This results in transverse discharges every 5 millimeters along the length of the tube. The radially-outward ends of the resistor leads of the cathode K are soldered together and form a continuous helical current distributor; while the resistor elements of the anode are joined in groups of ten, these groups being identified in FIG. 1 as $A_1$ through $A_4$. This causes a rough decoupling of each section with respect to its neighbor sections.

With specific reference to FIG. 2, there is shown a high voltage pulse generator connected to the output terminals of the energy storage means which are correlated to the bifilar helical electrode arrangement. The pulse generator operates in the charge transfer mode. The arrangement of the dumping capacitance $C_D$ has been adapted to the needs of the helical electrode structure. In order to achieve a uniform gas discharge on the full length of the electrode configuration, each anode section $A_1 \ldots A_n$ has been associated with its own dumping capacitor $C_{D1} \ldots C_{Dn}$ as a local energy storage element via an individual low-inductance current lead $Z_1 \ldots Z_n$. In order to obtain such leads as low-inductive as possible, the dumping capacitors $C_{D1} \ldots C_{Dn}$ are directly mounted into the free space within the bifilar helix (i.e., the capacitors are directly interposed between successive convolutions of the helical anode and the helical cathode) as is shown in FIG. 1.

The capacitors $C_{D1} \ldots C_{Dn}$ are connected in parallel to which charge is delivered from a separate energy storage means via a spark gap switch S that is provided with a spark initiator such as a conventional spark plug Tr. The generator includes a low inductance storage capacitor $C_S$ which is initially charged via resistor $R_1$ and resistors $R_{21} \ldots R_{2n}$ utilizing a high voltage supply until a spark occurs in the air pressurized spark gap switch S. This causes one side of capacitor $C_S$ to be grounded and transfers the charge from capacitor $C_S$ to the dumping capacitors $C_{D1} \ldots C_{Dn}$. The dumping capacitors may, for example, comprise 570 pF high voltage ceramic capacitors. The voltage in the laser tube increases as soon as the dumping capacitors $C_{D1} \ldots C_{Dn}$ are charged. These capacitors discharge quickly after breakdown of the gaseous medium within the laser tube. In the case of a nitrogen laser, the gas discharge results in direct electron impact excitation of the triplet states of molecular nitrogen's second positive band and a consequential laser action at 337.1 nm. The resistor $R_1$ acts to limit the current of the power supply through the spark gap switch S during the grounding phase. The low inductance storage capacitor $C_S$ can comprise eight simple 2400 pF high voltage ceramic capacitors connected in parallel. The inductance of the circuit can be kept low by utilizing a plurality of (e.g., 20) coaxial cables in parallel for connecting the storage capacitor $C_S$ with the discrete dumping capacitors $C_{D1} \ldots C_{Dn}$.

Figure 3:
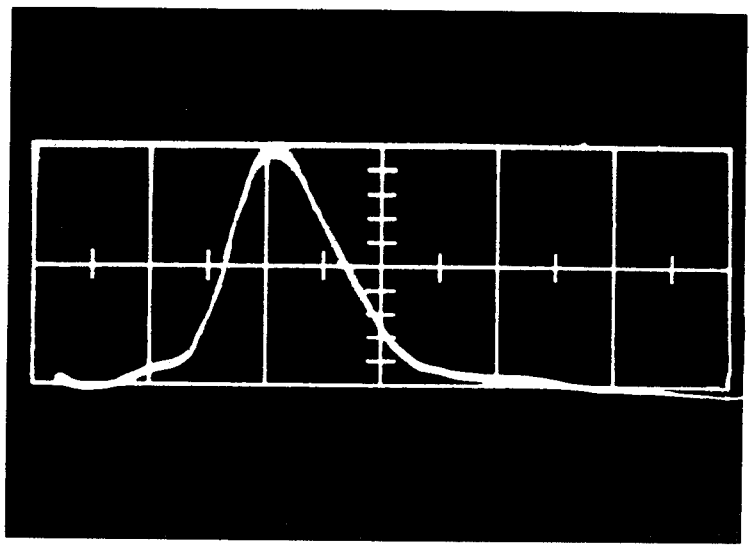
FIG. 3 is an oscillogram showing laser output power versus time with the use of the invention as applied to a nitrogen laser.

In an actual test, the laser of the invention was operated using a front surface aluminized glass substrate which also served as a mirror or as a total reflector M for the considered wavelength. The light intensity of the laser emission after the second passage was reduced at the front window using a set of metal-film coated neutral density filters. The laser pulses were recorded with a fast detection system consisting of a vacuum photodiode and an oscilloscope having a combined rise time of about 400 ps. A typical output from the laser is illustrated in FIG. 3. Output pulse peak power was derived from energy measurements utilizing an energy measuring device such as Model Rk-3230 of Laser Precision Corporation, together with a pyroelectric energy probe RkP-334 of the same manufacturer which was more reliable than the photodiode-attenuator combination because of its ability of averaging over 100 single pulses. As the laser had to be pressure tuned for optimum operation, data were taken by setting a constant charging voltage and scanning the gas pressure through a maximum of the laser output power. An appropriate gas flow in the laser tube was found to be very important, particularly during operation at high repetition rates because the residual ionization remaining from the previous pulsed discharge reduces the breakdown voltage in the gas considerably, resulting in a loss of laser output.

In FIG. 3, the waveform shown is an average of 3600 individual pulses. The vertical and horizontal deflections are equal to 150 kilowatts per centimeter and 5 nanoseconds per centimeter with a charging voltage of 22 kilovolts (measured at $C_S$) and a nitrogen pressure of 80 mbar. The threshold voltage to initiate laser action was 11 kilovolts. An output peak power of 480 kilowatts with an energy of 2.4 mJ per pulse was obtained with a charging voltage of 32 kilovolts. A pulse width of 5 to 6 nanoseconds was measured for the above-mentioned output peak pulse powers during the experiment. The specific laser energy amounted to 15 $\mu$ $J/cm^3$ in an active volume of 157 cubic centimeters with an overall efficiency of 0.03%. The reproducibility of pulses and the consequential laser stability can be seen from the superposition of a large number of single pulses resulting in the waveform of FIG. 3.

Figure 4:
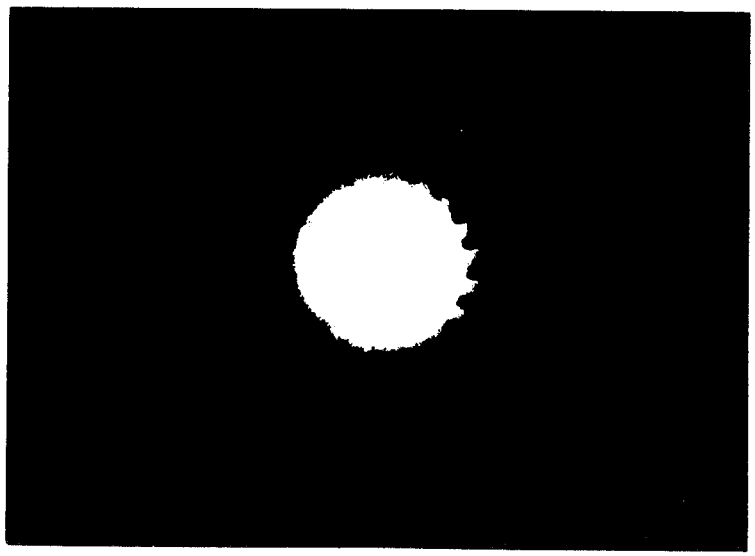
FIG. 4 is a cross-sectional view of the laser beam produced with a nitrogen laser embodying the principles of the invention.

A visual impression of the laser beam cross section is shown in FIG. 4. This was derived by directing the beam onto a fluorescent screen. The cross section is circular, having a near-field diameter of approximately 20 millimeters. This cross section was not attained by the use of circular diaphragms but is rather the specific consequence of the chosen discharge geometry—the helical electrode structure shown herein. Each pin discharge is rotated by a small angle with respect to each predecessor. This creates a well-defined circular, symmetrical laser beam which, in turn, can be easily focused using customary spherical optics. It should be noted that the pin tips of the last turn of the bifilar helix are projected onto the screen as a result of beam divergence or possibly as a result of laser emission created at the axis of the back part of the tube. The overall result is a sawtooth-like beam contour which can, if desired, be easily eliminated utilizing circular diaphragms that may be situated even internally of the laser envelope.

The results of the measurements establish that, utilizing the invention in a helical transversely excited nitrogen laser, electrical discharges can, in spite of lengthy inductance-loaded current loops, be made fast enough to effectively generate a population inversion in molecular nitrogen. In particular, it can be seen that the radial gain profile which is caused by numerous deliberately rotated or intertwined transverse discharges creates a circular, symmetrical laser beam which can be easily focused using customary spherical optics. The apparatus described herein is the first known helical, transversely-excited nitrogen laser with results comparable to those obtained by using conventional forms of construction.

Similarly good results can be obtained in a helical nitrogen laser of the type described above if the resistors $R_E$ are eliminated and replaced by simple wire pins, even if the subdivision into pin pairs of groups of ten is eliminated. Thus, a fine decoupling of neighboring discharges caused by resistors and a coarse decoupling caused by the formation of coordinate electrode sections do not take place any more. This surprising behavior of a simplified bifilar helical electrode arrangement is probably due to the fact that in the case of nitrogen, the optimum conditions for a homogeneous discharge (20 millibar to approximately 150 millibar) includes the optimum laser operation pressure (i.e., 50 to 80 millibar) such that no decoupling measures are necessary. However, such coincidence may not exist when other gases are used.

It is also possible to construct the cathode K as a simple helical bar without pin electrodes. All possibilities of decoupling and partition of electrode sections must be considered for the anode, however. It is also possible with such bifilar helical electrode arrangements to utilize a helical anode and helical cathode constructed in the form of extended intertwined electrode profiles of appropriate cross section. However, such an electrode arrangement requires a so-called preionization which serves to seed the discharge volume with a sufficient quantity of charge carriers before the main discharge is applied, thereby enabling a diffuse and homogeneous gas discharge despite the use of extended electrode profiles.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A bifilar helical electrode arrangement for the transverse excitation of a gaseous laser medium disposed within a laser envelope, comprising a helical anode and a helical cathode extending along said laser envelope, a plurality of capacitors closely adjacent to and spaced along the lengths of said anode and said cathode, low resistance and low inductance leads connecting one terminal of each capacitor to said anode, low resistance and low inductance leads connecting the other terminal of each capacitor to said cathode, and a pulse generator connected between said anode and cathode for delivering high-voltage pulses to said capacitors in parallel.

2. The electrode arrangement of claim 1 characterized in that the capacitors are spaced equidistantly one from the other.

3. The electrode arrangement of claim 1 wherein said capacitors are interposed between successive convolutions of said helical anode and said helical cathode.

4. The electrode arrangement of claim 1 including pin electrodes extending from said anode and said cathode to the discharge gap of said envelope.

5. The electrode arrangement of claim 4 wherein successive pin electrodes on said anode and cathode are decoupled from each other by virtue of decoupling resistors.

6. The electrode arrangement of claim 1 wherein at least said anode is segmented into separate electrode sections each of which is provided with a capacitor connected to said pulse generator.

7. The electrode arrangement of claim 6 wherein each electrode section is connected to at least one pin electrode which extends to the discharge gap of said envelope.

* * * * *